United States Patent [19]

Frish et al.

[11] Patent Number: 4,684,781
[45] Date of Patent: Aug. 4, 1987

[54] METHOD FOR BONDING USING LASER INDUCED HEAT AND PRESSURE

[75] Inventors: Michael B. Frish, Acton; Peter E. Nebolsine, Reading; Anthony N. Pirri, Andover, all of Mass.

[73] Assignee: Physical Sciences, Inc., Andover, Mass.

[21] Appl. No.: 695,966

[22] Filed: Jan. 29, 1985

[51] Int. Cl.⁴ .................................................. B23K 26/00
[52] U.S. Cl. ....................... 219/121 LU; 219/121 LA; 219/121 LM; 219/121 LD; 228/107; 228/115; 427/53.1
[58] Field of Search .... 219/121 L, 121 LA, 121 LM, 219/121 LU, 121 LZ, 121 LC, 121 LD; 228/107, 2.5, 3.1, 115, 242; 264/3 R, 84; 427/53.1

[56] References Cited

U.S. PATENT DOCUMENTS

| | | | |
|---|---|---|---|
| Re. 29,815 | 10/1978 | Granamuthu | 219/121 LM |
| 3,900,593 | 8/1975 | Herczog et al. | 219/121 L |
| 3,969,604 | 7/1976 | Baardsen | 219/121 LM |
| 4,023,005 | 5/1977 | Bolin | 219/121 LM |
| 4,117,302 | 9/1978 | Earle et al. | 219/121 LM |
| 4,121,087 | 10/1978 | Malmuth et al. | 219/121 L |
| 4,125,926 | 11/1978 | Gale et al. | 219/121 LM |
| 4,152,575 | 5/1979 | Banas | 219/121 LM |
| 4,185,185 | 1/1980 | Adlarn | 219/121 LM |
| 4,187,408 | 2/1980 | Heile | 219/121 LM |
| 4,218,494 | 8/1980 | Belmordo et al. | 219/121 LM |
| 4,224,499 | 9/1980 | Jones | 219/121 LM |
| 4,229,232 | 10/1980 | Kirkpatrick | 219/121 LA |
| 4,249,060 | 2/1981 | Colby | 219/121 LD |
| 4,251,709 | 2/1981 | Schumacher | 219/121 ED |
| 4,272,665 | 6/1981 | Steigerwald | 219/121 ED |
| 4,281,235 | 7/1981 | Peloquin | 219/121 ED |
| 4,281,236 | 7/1981 | von Allmen et al. | 219/121 LC |
| 4,320,281 | 3/1982 | Cruickshank et al. | 219/121 LD |
| 4,347,965 | 9/1982 | Grossman et al. | 228/107 |
| 4,354,090 | 10/1982 | Nilsen | 219/121 LC |
| 4,377,735 | 3/1983 | Minamida et al. | 219/121 LM |
| 4,401,477 | 8/1983 | Claver et al. | 219/121 L |

FOREIGN PATENT DOCUMENTS

| | | | |
|---|---|---|---|
| 42-24982 | 11/1967 | Japan | 228/107 |
| 42-24979 | 11/1967 | Japan | 228/107 |
| 44-18181 | 8/1969 | Japan | 228/107 |

OTHER PUBLICATIONS

Theory and Application of Pulsed Laser Welding by Anderson et al., Welding Journal, pp. 1018–1026, Dec. 1965.

*Primary Examiner*—M. H. Paschall
*Attorney, Agent, or Firm*—Weingarten, Schurgin, Gagnebin & Hayes

[57] ABSTRACT

A coated substrate manufactured by applying a layer of a material to the substrate and generating thermal and pressure waves in the layer by exposing the layer to high intensity, short duration laser radiation, and the process of manufacturing such a coated substrate. The laser radiation is applied in an intensity range that creates an instantaneous surface vaporization of the layer material that in turn drives a pressure wave into the layer. The pressure wave interacts with the layer-substrate interface to create bonding between them of varying strengths and qualities depending on the intensity and duration of the initial laser pulse. A thermal wave is created in some regimes of operation, or results from compressional heating of the layer by the pressure wave, and is of sufficient energy to contribute to the bonding at the interface. The coating and the process for its creation has application in diverse areas where surface properties of a particular color, hardness, corrosion resistance, abrasion resistance, electrical conductivity, among others are desired.

7 Claims, 4 Drawing Figures

METHOD FOR BONDING USING LASER INDUCED HEAT AND PRESSURE

FIELD AND BACKGROUND OF THE INVENTION

Metal foil coatings on underlying metallic substrates are desired for many applications where the properties of the substrate in bulk are needed in combination with the surface properties of the coating. Such surface properties as color, hardness, corrosion and abrasion resistance, electrical conductivity and others can be selected by the application of a thin foil layer onto a substrate material otherwise lacking those properties.

There are many techniques available for applying coatings to substrate which run the gamut from conventional painting or adhesive approaches to more high technology processes of plasma spraying or laser surface modification. These various systems represent tradeoffs in efficiency of the coating process, adhesion of the coated layer, and the desired surface properties.

The application of laser energy has been used in the past to condition uncoated substrate surfaces such as by creating surface hardness alterations by, for example, heating of a substrate surface and creation of a pressure wave within a substrate. On the other hand, lasers have also been utilized for welding materials together by the application of sufficient energy over time to provide a thermal melting of two materials which results in a welded joint.

The need to provide surface properties which can withstand increasingly harsh treatment and environments brings forth the need to apply coatings to substrates which are not readily joined by conventional technologies such as laser welding.

SUMMARY OF THE INVENTION

In accordance with the teaching of the present invention, a process is disclosed for using laser induced pressure wave effects for bonding a variety of different metallic foils onto metallic substrates. It is thus possible to radically alter the surface properties of a substrate with a well adhered foil coating of a very dissimilar material with different properties.

The process permits the realization of combinations of substrates and coating materials which have previously not been capable of direct metallic or alloy bonding by conventional techniques.

In practicing the invention a foil layer of a material to be applied as a coating to a substrate is laid over and in contact with the substrate surface which is to be coated. A laser beam, typically pulsed, and of a very high instantaneous intensity is applied to the exposed foil layer.

The intensity of the radiation as focused onto the foil at a small spot is extremely high, substantially greater than that used in prior applications such as laser welding. The extremely high laser intensity produces an instantaneous vaporization of a small portion of the foil surface. The reaction to the vapor pressure generated by the foil surface vaporization is a pressure or shock wave transmitted through the thin foil layer in the direction of the interface between the foil and substrate. Depending upon the intensity and duration of the applied laser radiation, the interaction at the interface between the foil and substrate from the pressure wave, which may be accompanied by a subsequent thermal wave generated from absorbed laser energy or from compressional effects of the pressure wave, will produce different interface results, typically viewed as different regimes of foil and substrate interaction. These regimes can span a range including at one extreme relatively weak bonding produced by a relatively low intensity short duration pulse, in which condition the only bonding effect is produced by the pressure wave effect. At the other extreme, a very high intensity radiation pulse will produce bonding resulting from a combination of thermal melting induced by the pressure wave compressional effect and hydrodynamic mixing produced by the mechanical effect of the pressure wave itself. A thermal wave from the laser heat absorbed at the surface, for laser pulses of sufficient duration, can additionally produce a remelting and solidification of the alloy at the interface, affecting the ultimate alloy and bond properties produced.

In regimes having large pressure wave effects for producing interface alloying and bonding, the rapid cooling which occurs with the passage of the pressure wave can be utilized to achieve a distinct bond character.

Laser power densities, typically usable in the present invention, range from hundreds of megawatts per square centimeter to hundreds of thousands of megawatts per square centimeter with pulse durations measured in a few hundreths of a microsecond up to well over twenty microseconds. Lasers of different spectral output may be utilized with coupling efficiency depending upon the specific absorptivity of the coating to be applied.

The bonding of the coating to the substrate is conducted in an evacuated environment, though it is a significant feature of the present invention that surface cleaning or other preparation, typical of other bonding techniques, is not required in accordance with the present invention. An entire foil may be bonded to a substrate by scanning the laser beam, or by moving the substrate, so that the beam is applied in successive spots to the entire foil area. Focusing optics are employed, comprising either lenses or low distortion mirrors, to produce spot sizes on the order of hundreds of microns. Foil thicknesses from several microns up to over a hundred microns may be utilized.

DESCRIPTION OF THE DRAWING

These and other features of the present invention are more fully set forth below in the solely exemplary detailed description and in the accompanying drawing of which.

DETAILED DESCRIPTION

The present invention contemplates bonding a surface metallic foil to a metallic substrate using pressure wave induced alloying of the coating and substrate materials at their interface, with or without the influence of thermal effects produced by the application of high intensity short duration laser radiation to the foil surface.

Figure 1:
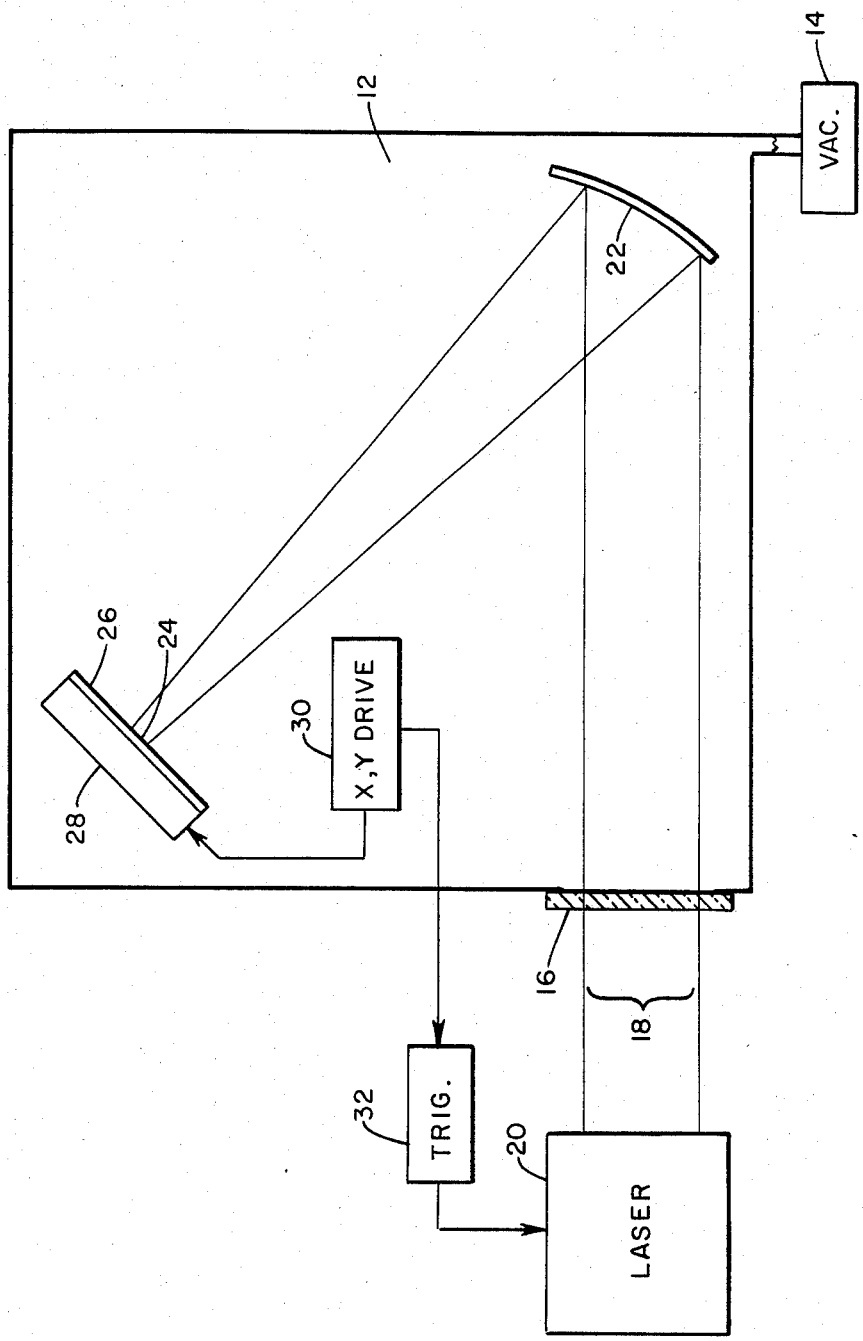
FIG. 1 is a system diagram of a first embodiment of apparatus for practicing the process of the invention.

A first embodiment of apparatus for practicing the invention is illustrated in FIG. 1 in which a chamber 12 is evacuated by a vacuum pump 14 to a low pressure, typically under 20 millitorr. The chamber 12 contains a laser-beam-transmitting window 16, typically of sodium or potassium chloride, to admit a beam 18 of radiation from a $CO_2$ laser 20. Within the chamber 12 a focusing mirror 22, typically of copper to provide good thermal conductivity with low distortion, focuses the beam 18 to a small spot 24 on the surface of a foil layer 26 applied to a substrate 28. An XY drive system 30 is provided to move the substrate 28 to provide scanning by the beam 18 and spot 24 across the surface of the foil 26 so as to expose all of the surface area of the foil to the radiation.

The laser 20 is typically a pulsed laser and is triggered by a trigger system 32 which is operated in conjunction with XY drive system 30 so as to provide overlapped pulsed spots of applied laser radiation as substrate 28 is incrementally moved.

The laser 20 may be of a number of types, either a $CO_2$ laser or a neodynium solid glass laser being typical, depending upon the spectral output desired for the particular foil being applied, as described more fully below.

Figure 2:
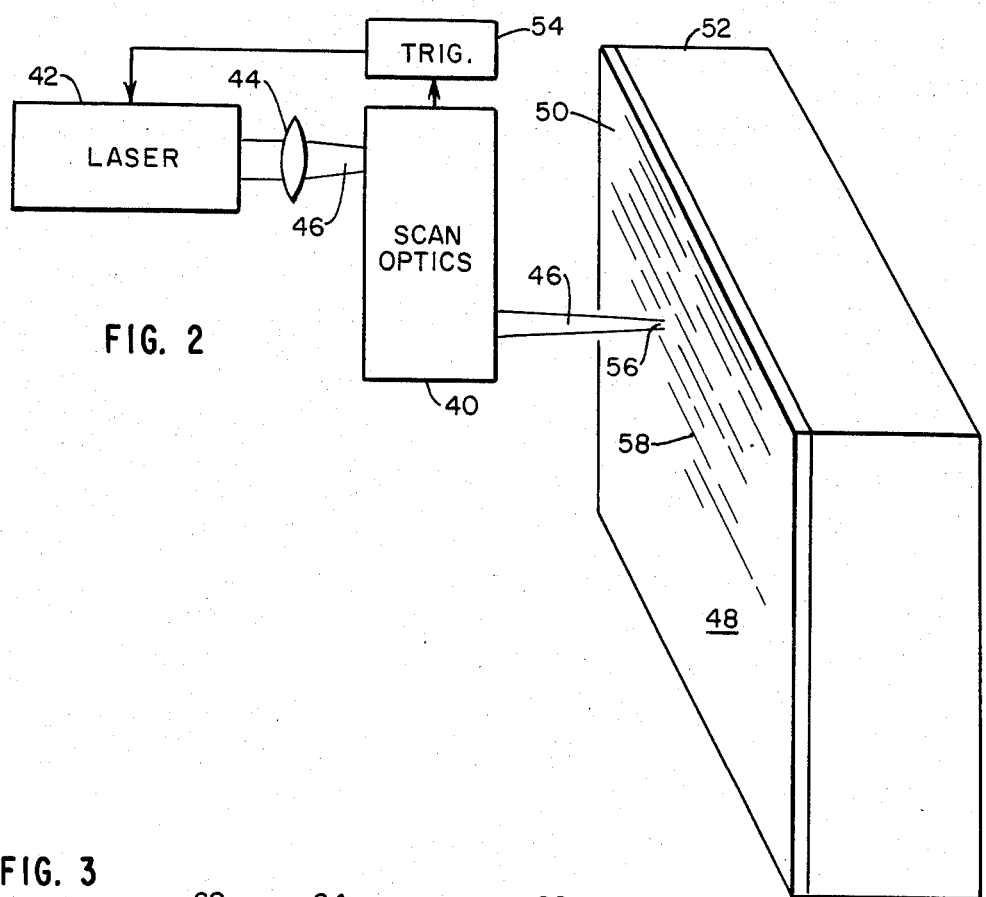
FIG. 2 is a system diagram of a second embodiment of apparatus for practicing the invention.

Instead of driving the substrate 28, an optical scanning system such as the system of scanning optics 40 illustrated in FIG. 2 may be utilized. As shown there, a laser system 42, which may be of a design described above, is focused through a lens system 44 with the resulting converging beam 46 scanned across a surface 48 of a foil layer 50, applied in contact with the surface of a substrate 52. A trigger system 54 synchronizes pulses in the laser system 42 with scan position of the converging beam 46 to provide overlapping spots 56 in scan lines 58 on the surface 48 of the foil layer 50. Typically the substrate 52 and foil layer 50, as well as the scan optics 40, will be located within an evacuated chamber as described with respect to FIG. 1.

Typical laser characteristics include an output per pulse in joules ranging from a few joules up to several hundred joules. Typical joules levels for $CO_2$ lasers would be from 15 to 250 joules in the experiments recited below while typical neodynium laser output would be 500 joules.

The laser pulse duration is measured in small fractions of a microsecond or longer, typically 30 nanoseconds for the neodynium laser, and up to several microseconds, for $CO_2$ lasers. Two microseconds and 15 microseconds are typical for $CO_2$ lasers.

The focusing produces a small spot size, typically 300 by 700 microns, where the beam is applied to the surface of the foil layer. In such circumstances $CO_2$ lasers can deliver an fluence of, typically, 7 $kJ/cm^2$ with a peak flux in the range of about 8 $GW/cm^2$. This will produce a pressure of approximately $1.6 \times 10^{10}$ dyne/$cm^2$. In another $CO_2$ laser application, a 250 joule pulse was delivered yielding a flux of 20 $MW/cm^2$ to 200 $MW/cm^2$ and generating peak pressures of 400 atmospheres, with spot sizes ranging from 1 mm to 1 cm. A 250 Joule pulse at a 1 cm diameter spot (0.78 $cm^2$ spot area) yields a fluence of 320 $J/cm^2$ (250 $J/0.78$ $cm^2 = 321$ $J/cm^2$, which rounds to 320 $J/cm^2$). This corresponds to a 20 $MW/cm^2$ pulse with the 15 microsecond duration.

The two $CO_2$ laser applications described above are referred to as laser systems A and B respectively in the experimental results presented below.

In the case of a neodynium laser, a total pulse energy of 500 joules distributed over 30 nanoseconds produces a flux density ranging from a few $GW/cm^2$ up to as much as 130 $GW/cm^2$ depending upon the spot size. Several laser beams, typically up to four, are combined onto a single spot or focused on adjacent spots. This laser system is referred to as laser system C in the experimental results presented below.

Foil thicknesses typically used in the experiments span the range of a few microns up to 100 microns. While a number of different substrate and foil metal types may be utilized in accordance with the present invention, in the experiments aluminum foil was used on copper and tantalum substrates, tantalum foil was bonded to copper substrates, titanium foil was bonded to copper substrates, tungsten was bonded to copper, aluminum, stainless steel, and INCONEL substrates, iron was bonded to INCONEL and copper substrates, and nickel foils were bonded to stainless steel and copper substrates.

Figure 3:
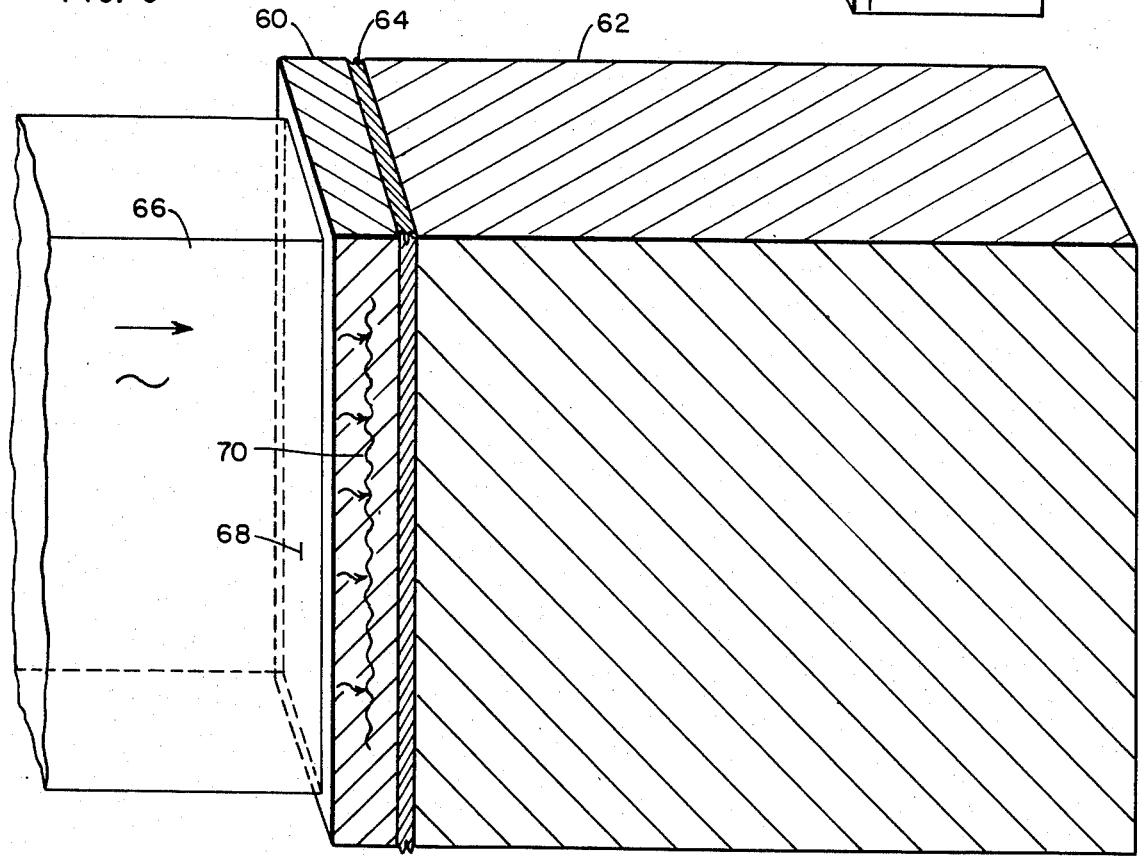
FIG. 3 is a detailed internal sectional view of a foil and substrate with applied radiation showing bond interaction between foil and substrate according to the present invention.

Depending upon the intensity of the laser radiation and its duration, at least eight different regimes are possible, representing different interactions of pressure waves, compressionally induced thermal waves and laser heating thermal waves at the foil interface with the substrate. These are illustrated by the waveforms of FIG. 4 in conjunction with the expanded drawing of FIG. 3 illustrating a foil 60 being bonded onto a substrate 62 through an interface 64, under the influence of applied laser radiation 66 of a predetermined magnitude and duration.

The pulse of laser radiation in the beam 66 is of sufficient instantaneous energy density to produce vaporization of foil material from the surface 68 of the foil 60 with a sufficiently explosive effect to generate a pressure wave 70 travelling through the foil 60 from the vaporized surface to the interface 64. Typically the laser radiation will be of sufficiently short duration to vaporize only a small portion of the foil layer 60.

Figure 4:
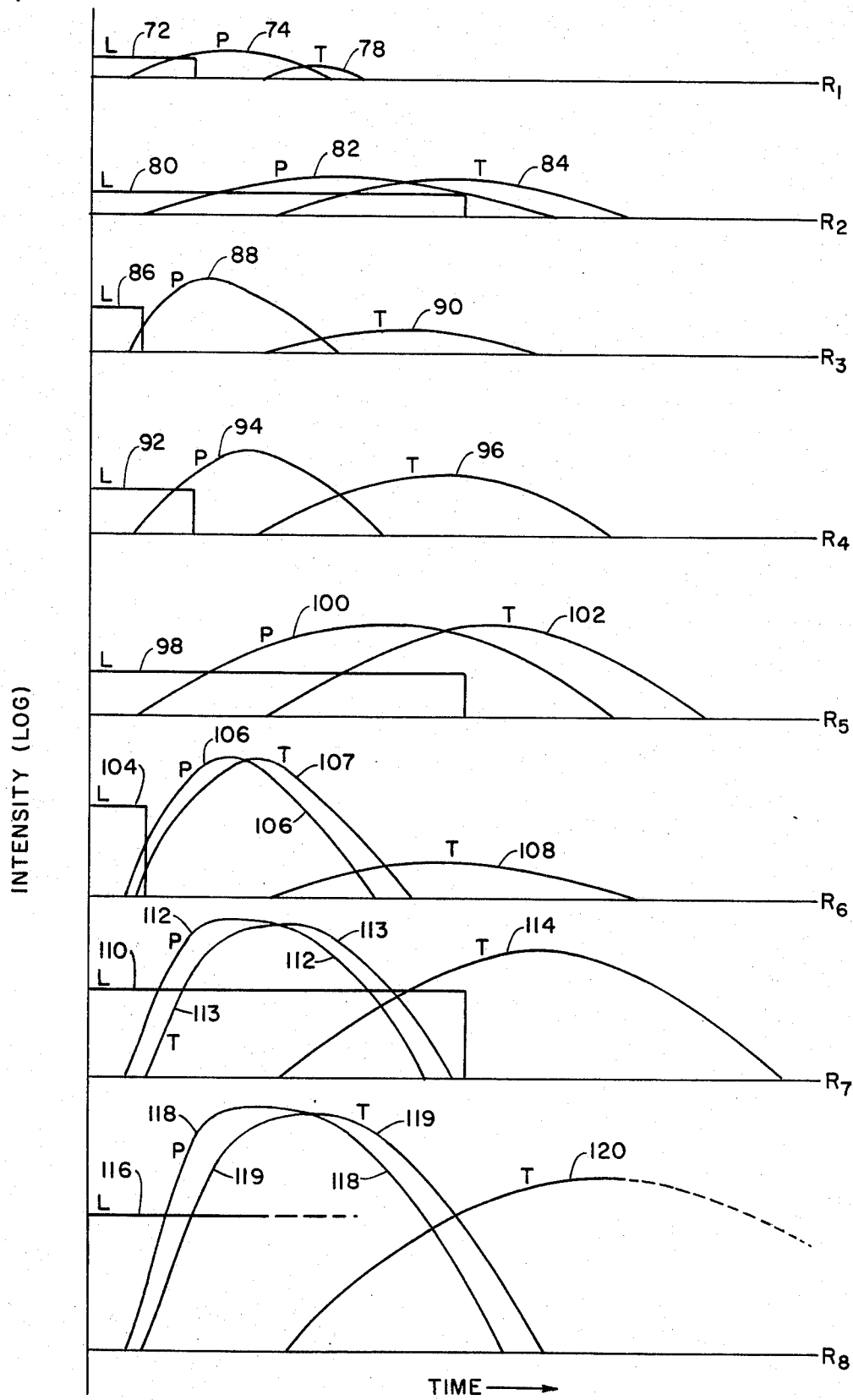
FIG. 4 represents a set of waveform diagrams for applied radiation and resulting pressure and thermal waves over eight regimes encountered in practicing the invention.

In the first regime, illustrated in FIG. 4, the pressure wave 70 induced in the foil by a laser pulse 72 of relatively low intensity and short duration will produce a pressure wave 74 which appears at the interface 64. The wave 70 avoids overall melting of the foil. The pressure wave 74 in the first regime (as noted in Table I) produces a very weak bond, if any, because the magnitude of the pressure wave 74 is below the critical pressure to produce alloying of the foil and substrate materials at the interface 64. In addition, the laser duration is sufficiently short that the radiant energy terminates before the thermal wave reaches the interface 64 and the resulting thermal wave 78 is too weak to produce any melting or alloying at the interface 64. Some bonding is nevertheless possible in regime 1 as illustrated in the accompanying table of experimental results (Table I).

In regime 2 a laser pulse 80 of low intensity and relatively long duration produces a pressure wave 82 insufficient to produce substantial bonding on its own but, due to the length of the laser pulse, a thermal wave 84, resulting from the application of laser energy, creates interface melting which, aided by the mixing effect of the pressure wave 82, produces alloying and bonding.

In regime 3, a moderate intensity, very short duration laser pulse 86 generates a pressure wave 88 of sufficient magnitude to produce a plastic flow of the materials at the interface and a resulting strong mechanical bond. The thermal wave 90, because of insufficient total energy applied in the laser pulse, is too weak to produce any melting at the interface.

In regime 4 a laser pulse 92 of moderate amplitude and short duration produces a pressure wave 94, which like the wave 88, produces melting at the interface and a strong bond. The subsequent thermal wave 96 subsequently melts the interface followed by rapid cooling.

In regime 5 a moderate intensity laser pulse 98 of relatively long duration produces a pressure wave 100 that, as in the previous regime, produces a mechanical melting at the interface resulting in a good bond. Melting from a thermal wave 102 occurs while pressure effects are still felt within the interface, with some hydrodynamic mixing occurring. The total result approximates that of regime 2 in some respects.

In regime 6, a relatively high intensity, very short duration laser pulse produces a pressure wave 106. The material compressional effects of the pressure wave 106 creates a temperature rise 107 and associated thermal melting of the interface which contributes to the bonding. Very rapid interface cooling results following the pressure wave 106 while the following thermal wave 108 is of insufficient magnitude to have any remelting effect.

In regime 7 a relatively high intensity long duration laser pulse 110 produces a high intensity pressure wave 112 which produces a compressional effect temperature rise 113 bonding as in regime 6. The subsequent thermal wave 114 remelts the interface producing a result similar to that in regime 2.

In regime 8 a very high intensity laser pulse 116, produces a pressure wave 118 and associated thermal effect 119, the shock effect of which creates a melting and mixing effect at the interface which remains molten for the subsequent thermal wave 120. The ultimate bonding produced is similar to that exhibited by regime 2.

Several foil bondings onto substrates have been achieved according to the present invention, the parameters of which are recited in Table II. These illustrate the flexibility and diversity of the bonding which can be achieved in accordance with the present invention over a range of laser types and flux densities, and of substrate and foil materials. Table II is not intended to be exhaustive of the scope of the invention, but merely illustrative of the capability of the present system to produce a foil to substrate bond for diverse material types which exhibits strength and durability without impairing the nature of the foil surface. In this manner, surface properties of an underlying substrate material can be readily modified to a wide range of desired properties.

Because the examples given above are clearly intended to present typical implementation of the present invention, the scope of the process and resulting coated products, according to the invention, is to be limited only by the following claims.

TABLE I

Regime 1
Intensity  low
Duration   short
Results    Weak or nonexistent bonding of the foil and substrate. Laser induced pressure is below critical pressure to create alloy bonding. The laser terminates before the thermal wave reaches the interface.

Regime 2
Intensity  low
Duration   long
Results    Thermal melting results from temperature wave reaching the interface while radiation is still applying heat energy to the foil. The pressure wave is below critical pressure to create bonding by itself but contributes to mixing and diffusion of the foil and substrate materials.

Regime 3
Intensity  moderate
Duration   very short
Results    The pressure is sufficient to produce plastic flow of the materials at the interface and produces a strong mechanical bond. The total energy is insufficient to produce any melting from heat effects.

Regime 4
Intensity  moderate
Duration   short
Results    Pressure induced plastic flow creates a very strong bond. The thermal wave subsequently melts the interface. Rapid cooling follows the thermal wave.

Regime 5
Intensity  moderate
Duration   long
Results    A mechanical melt bond is created by the pressure waves. The thermal wave arrives while the pressure effects are still being felt causing melting.

Regime 6
Intensity  high
Duration   very short
Results    The compressional effects of the pressure waves creates thermal melting of the interface and bonding. Very rapid cooling occurs after the passage of the pressure wave freezing the interface. The thermal wave is too weak to have any impact on melting.

Regime 7
Intensity  high
Duration   long
Results    Bonding occurs from the compressional effects of the pressure wave as in regime 6. The subsequent thermal wave remelts the interface with results similar to regime 2.

Regime 8
Intensity  very high
Duration   open
Results    The shock wave from the pressure effects creates melting and mixing. They remain melted during shock relaxation with ultimate results similar to regime 2.

TABLE II

TEST MATRIX

| Substrate | Coating | Thickness (μm) | Laser | Nominal Flux (MW/cm²) (10⁶ W/CM²) | Regime† | Comments† |
|---|---|---|---|---|---|---|
| Copper | Al | 25 | A | 8000 | 4 | Mid-size, strong bond |
| Steel | Al | 25 | A | 8000 | 4 | Mid-size, strong bond |
| Copper | Ta | 25 | A | 8000 | 4 | Small bond |
| Copper | Ta | 50 | A | 8000 | 4 | Small bond |
| Copper | Ti | 25 | A | 8000 | 4 | Mid-size, non-uniform bond |
| Copper | W (mesh) | 25 | A | 8000 | 4 | Small bond |
| Copper | Al | 25 | A | 800 | 1–4 | Smooth, strong bond |
| Aluminum | W | 25 | B | 20 | 1–2 | Ragged bond on substrate |

TABLE II-continued

TEST MATRIX

| Substrate | Coating | Thickness (μm) | Laser | Nominal Flux (MW/cm²) (10⁶ W/CM²) | Regime† | Comments† |
|---|---|---|---|---|---|---|
| Aluminum | W | 50 | B | 20 | 1 | Foil still intact |
| Stainless steel | W | 25 | B | 20 | 1-2 | Ragged bond on substrate |
| Inconel | W | 25 | B | 20 | 1-2 | Vapor deposit only |
| Cu | Al | 25 | B | 20 | 2 | Smooth, uniform bond |
| Cu | Al | 50 | B | 20 | 1-2 | Vapor deposit only |
| Ta | Al | 25 | B | 20 | 2 | Smooth, uniform coating |
| Inconel | Fe | 25 | B | 20 | 1 | No bond |
| Stainless steel | Ni | 25* | B | 20 | 1 | No bond |
| Cu | Ni | 12.5 | B | 20 | 1-2 | Slight vapor deposit |
| Cu | Ni | 25* | B | 20 | 1 | No bond |
| Cu | Fe | 25 | B | 20 | 1 | No bond |
| Cu | W | 25 | B | 20 | 1-2 | No bond |
| Aluminum | W | 25 | B | 200 | 1-2 | Ragged, mid-size bonds |
| Stainless steel | W | 25 | B | 200 | 1-2 | Ragged, mid-size bonds |
| Inconel | W | 25 | B | 200 | 1-2 | Bond around edges of laser |
| Ta | Al | 25 | B | 200 | 2 | Large, bonded area |
| Cu | Al | 25 | B | 200 | 2-4 | Obvious Cu/Al alloy formation |
| Inconel | Fe | 25 | B | 200 | 1 | Small bond |
| Stainless steel | Ni | 12.5 | B | 200 | 1-2 | Large, smooth bond |
| Cu | Ni | 12.5 | B | 200 | 1-2-4-5 | Large, non-uniform bond |
| Cu | Fe | 25 | B | 200 | 1 | Vapor deposit only |
| Inconel | W | 25 | C | 6000-24000 | 1-4 | No bond |
| Cu | Al | 100 | C | 6000-24000 | 4 | Non-uniform bond |
| Cu | W | 25 | C | 6000-24000 | 1-4 | No bond |
| Cu | Al | 25 | C | 6000-24000 | 4 | Non-uniform bond |
| Cu | Al | 125 | C | 33,000 | 4 | ? |
| Cu | Al | 125 | C | 100,000 | 4-7 | Bonded |
| Inconel | W | 25 | C | 33,000 | 4 | No Bonded |
| Inconel | W | 25 | C | 100,000 | 4 | Non-uniform, weak bond |
| Inconel | W | 25 | C | 130,000 | 4 | Large, uniform but very weak bond |
| Cu | Al | 75 | C | 130,000 | 4-7 | Obvious Al/Cu alloy formation |
| Inconel | W | 25 | C | 130,000 | 4 | Large, uniform, very weak bond |

*Actually two layers of 12.5 um foil
†Multiple numbers indicate cases which fall near borderline
†Large > 5 mm diameter
Mid-size 1-2 mm diameter
Small < 1 mm diameter

What is claimed is:

1. A process for metallurgically bonding a layer of a coating material to a substrate, comprising the steps of:
    applying a layer of metal foil having a thickness in the range of approximately 12.5 to 125 microns to a surface of a metallic substrate to be coated, thus creating a foil-substrate interface;
    applying pulsed laser radiation of a localized intensity, predetermined duration, and fluence greater than approximately 320 Joules per square centimeter directly to the surface of the applied foil layer to vaporize some of the foil surface, produce a pressure wave in the foil layer traveling from the layer surface toward the substrate, and cause a temperature rise sufficient to melt the foil-substrate interface, the combination of said pressure wave and said temperature rise achieving bonding of said foil layer to said substrate.

2. The process of claim 1 further including the step of scanning the radiant energy across the surface of the layer.

3. The process of claim 1 wherein the radiant energy has a power density within the range of 200 to 130,000 megawatts per square centimeter.

4. The process of claim 1 wherein the duration of the radiant energy is in the range of 0.03 to 15 microseconds.

5. The process of claim 1 wherein the layer material is selected from the group consisting of aluminum, tantalum, titanium, tungsten, iron, nickel.

6. The process of claim 1 wherein the substrate material is selected from the group consisting of copper, steel, aluminum, stainless steel, INCONEL, and tantalum.

7. A substrate coated with a layer of a material in accordance with the process of claims 1, 2, 3, 4, 5, or 6.

* * * * *